May 24, 1927.

E. A. BURROW

ROAD LEVELER OR PLANER

Filed Feb. 1, 1924

1,629,678

3 Sheets-Sheet 1

INVENTOR
E. A. Burrow
BY
ATTORNEY

May 24, 1927.
E. A. BURROW
1,629,678
ROAD LEVELER OR PLANER
Filed Feb. 1, 1924
3 Sheets-Sheet 2
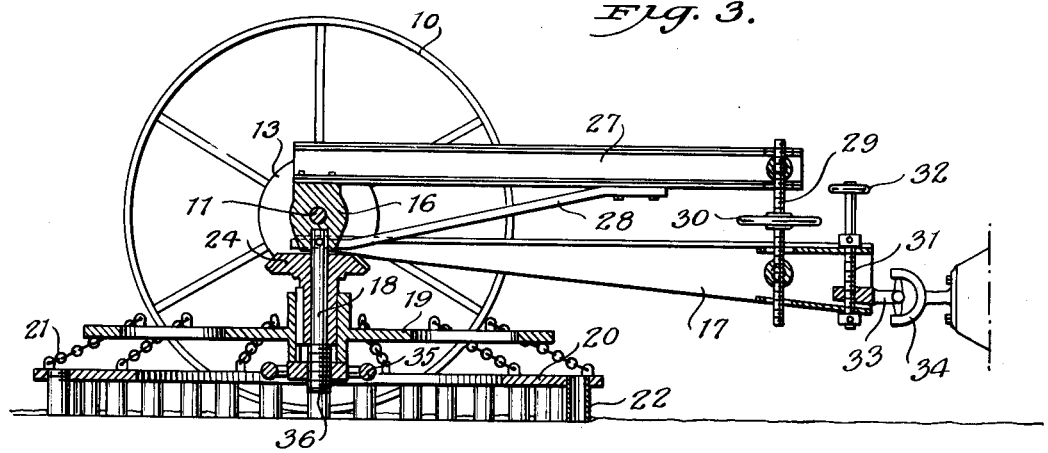
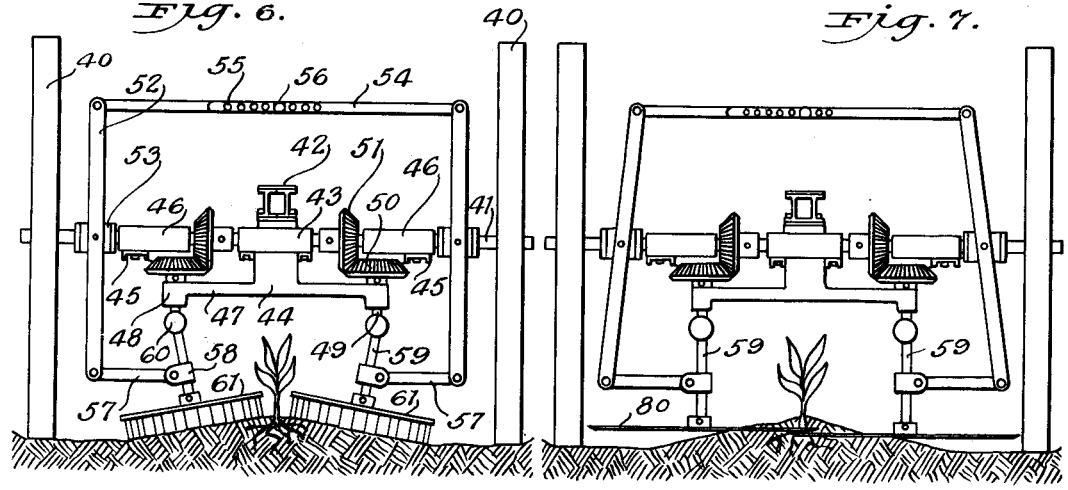
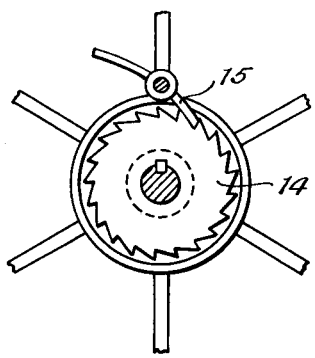
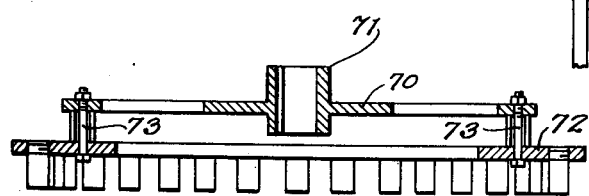
INVENTOR
E. A. Burrow
BY
ATTORNEY May 24, 1927.
E. A. BURROW
ROAD LEVELER OR PLANER
Filed Feb. 1, 1924
3 Sheets-Sheet 3
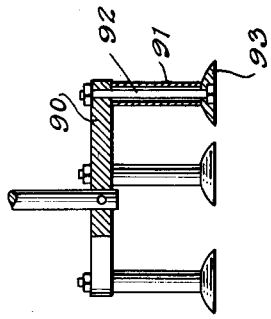
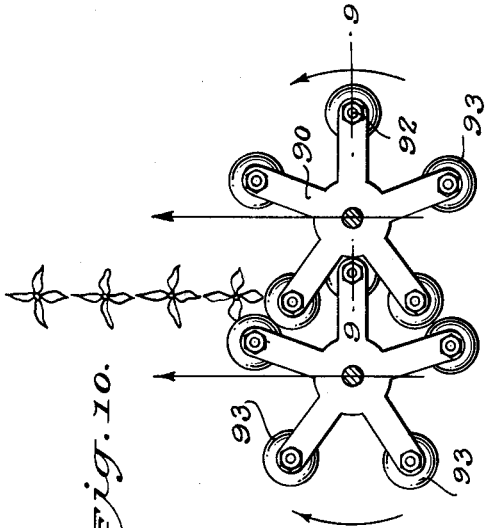
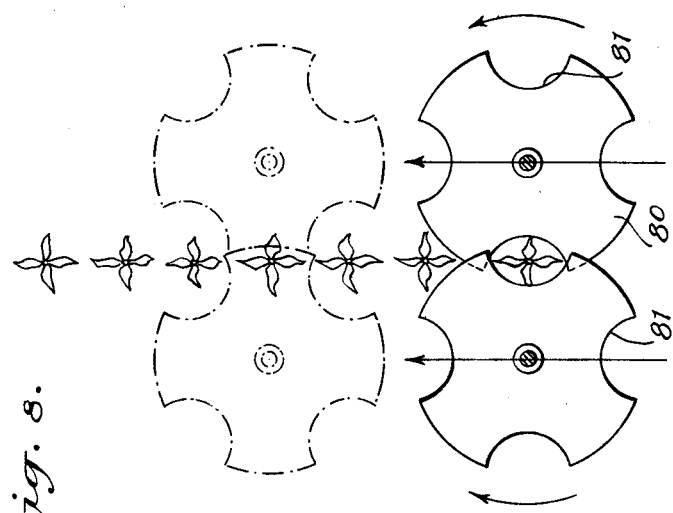
INVENTOR
E. A. Burrow
BY
ATTORNEY Patented May 24, 1927.

1,629,678

UNITED STATES PATENT OFFICE.

EDGAR A. BURROW, OF BRADY, TEXAS.

ROAD LEVELER OR PLANER.

Application filed February 1, 1924. Serial No. 689,916.

This invention relates to improvements in road levelers or planers, an object of the invention being to provide a device of this character for efficiently and expediously smoothing or leveling roads.

It is a further object of the invention to provide a device of this character which is convertible into a machine for working row crops and which may be used either as a plow or as an apparatus for thinning out a row of plants.

It is a further object of the invention to provide novel actuating means which may be used for operating either the planer or different sets of agricultural implements, as above suggested.

The invention further contemplates the provision of various novel features which will add to the efficiency and adaptability of the apparatus.

With these and other objects in view, the invention consists in certain novel features of construction and combinations and arrangements of parts as will be more fully hereinafter described and pointed out in the claims.

Figure 1:
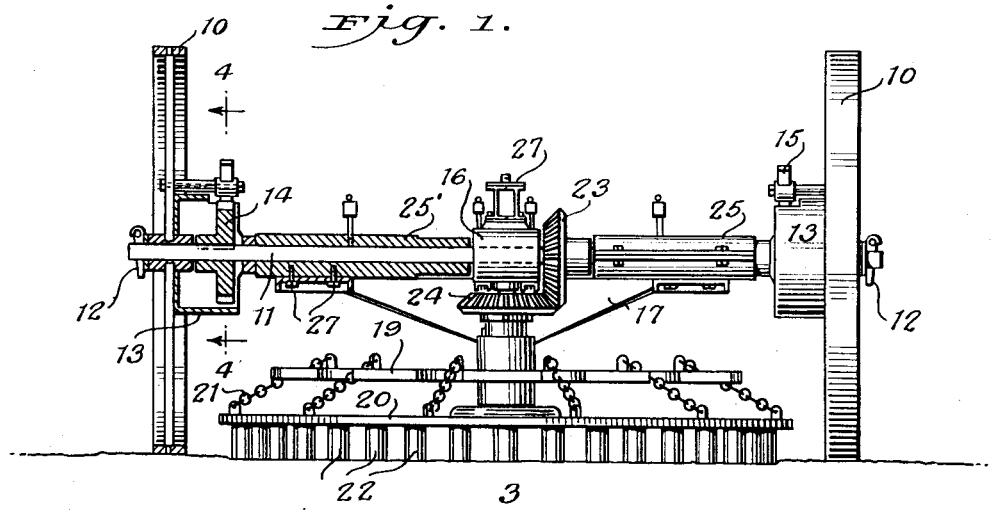
Figure 2:
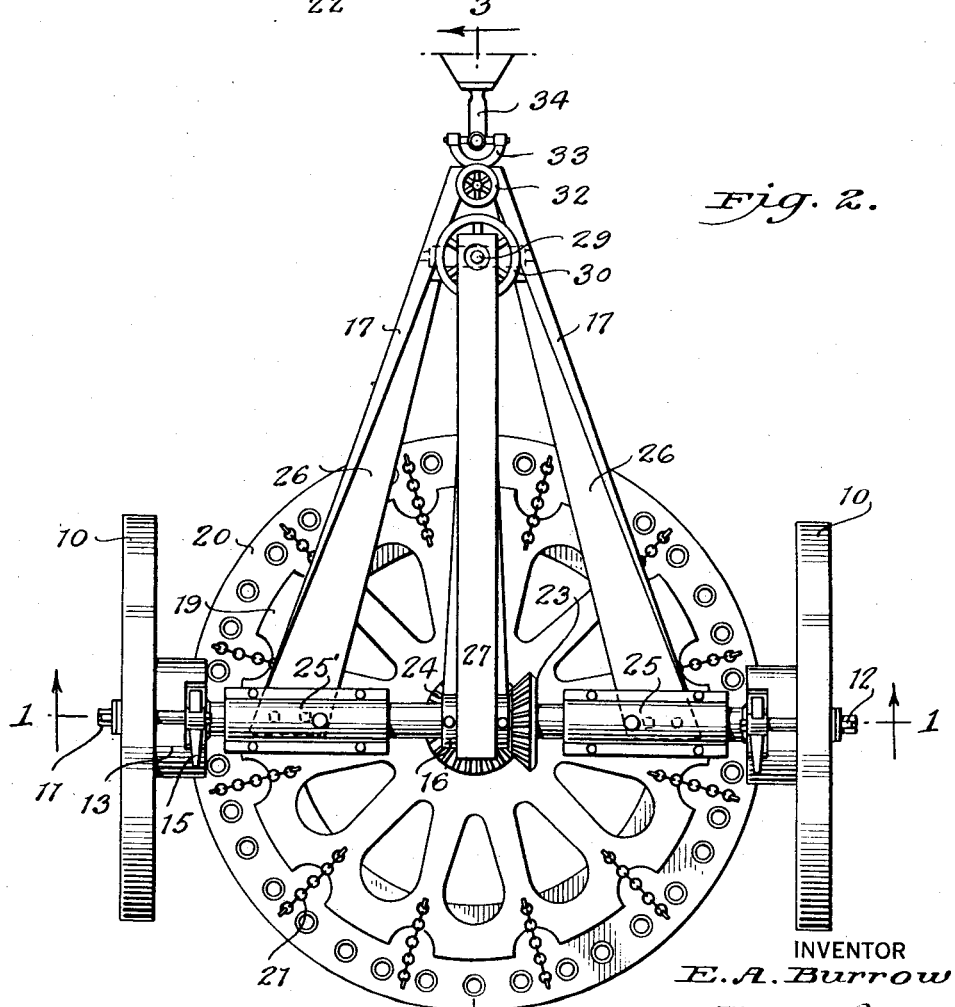

In the accompanying drawings,

Fig. 1 is a view in rear elevation of my improved planer, parts being broken away and in section for clearness, Fig. 2 is a plan view thereof, Fig. 3 is a view in longitudinal section on the line 3—3 of Fig. 2, Fig. 4 is a detail view of the driving mechanism for the planer, and Fig. 5 is a view in transverse section through a modified form of drag member, Fig. 6 is a view in rear elevation showing the construction used when cultivating implements are substituted for the planer, Fig. 7 is a similar view illustrating a modified type of cutting implement used in thinning out a number of plants in a row, Fig. 8 is a diagrammatic view illustrating the operation of the type of implement shown in Fig. 7, Fig. 9 is a detail sectional view on the line 9—9 of Fig. 10, and Fig. 10 is a plan view illustrating a modified type of implement for performing the functions of the implements shown in Figs 7 and 8.

Referring with particularly to Figs. 1, 2, 3 and 4 of the drawings, it will be noted that I have used the reference characters 10, 10 to designate the two traction wheels of my improved planer. These wheels revolve freely on opposite ends of an axle 11, being retained on the axle by pins 12. Gear cases
13 are secured upon the inner faces of the two traction wheels and gears 14 within the gear casings are keyed to the axle 11 for effecting turning movement thereof. Any suitable means may be provided for actuating the gears 14 but I prefer to use pawls or dogs 15 engageable with the gears and to form the gears as ratchet wheels, as clearly shown in Fig. 4.

By virtue of this construction, a differential action may be had between the two wheels when a turning movement is imparted to the device, since the teeth of one ratchet gear 14 will be free to over-ride the pawl 15 which normally actuates them. Pawls 15 are secured either upon the traction wheels or upon the gear cases in any approved manner, so that they turn with the wheels.

Centrally mounted upon the axle 11 is a hub 16 which serves as a supporting means for the planer mechanism, carrying a depending hanger 18, upon which a spider 19 is revolubly mounted. Planer 20 is hung from the spider by any suitable means such as the flexible device 21. Sufficient play is provided in the flexible device to permit the planer to rest upon the ground and act as a drag. The planer consists of an annular ring carrying a plurality of downwardly presented teeth 22, these teeth preferably taking the form of short lengths of pipe. Teeth of this character lend weight to the drag and at the same time, are extremely unlikely to break when the drag engages obstructions in the road.

The mechanism for revolving the drag is seen most clearly in Fig. 1, and consists of a beveled gear 23 fixed upon the axle 11, and driving a beveled gear 24 secured to the spider 19. Spacer sleeves 25 and 25' are respectively provided between the gear 23 and one gear case 13, and between the hub 16 and the other gear case 13. The draw bar 17 includes a pair of angular members 26 (Fig. 2) united at their forward ends and connected at their rear ends to the respective sleeves 25 and 25' by bolts or other securing devices 27 (see Fig. 1).

By virtue of this connection with the sleeves it will be apparent that the draw bar might normally be tilted to any angle. In order to limit this tilting movement, however, I secure a tongue 27 to the hub 16, bracing this tongue by an angular brace 28, likewise secured to the hub. Tongue 27 and draw bar 17 are operatively connected adjacent their forward ends by a screw 29, having right and left hand threads and having a central hand wheel 30 for actuating the same. In the extreme forward end of the draw bar, there is mounted a second screw 31 controlled by a hand wheel 32. Turning of the screw 31 effects vertical movement of a coupling member 33 adapted for connection with a tractor hitch 34. By adjusting the screw 31, therefore, coupling member 33 may be raised or lowered to any desired position so that a straight line pull is had when the coupling member is secured to the hitch.

Bearing in mind the substantially rigid connection between the tractor and the axle 11 of the planer, it will be apparent that turning of the hand wheel 30 will not effect a depression of the forward end of the draw bar, but will merely effect elevation of the forward end of the tongue 27, the screw 29 working through the tongue 27 and working out of the draw bar 17. In other words, turning movement of the hand wheel 30 will effect lifting of the forward end of the tongue, and consequent tilting of the hub 16 and of the planer mechanism which is suspended from the hub.

The manner of use of this planer mechanism is too well understood to warrant discussion, and the operation will be apparent from the foregoing description. As the tractor pulls the planer over the ground, revolution of the traction wheels 10 of the planer will act through the intermediacy of the ratchet wheels 14 and gears 23 and 24 to revolve the planer so that a combined dragging and revolving action is had for efficiently leveling the ground. The means for adjusting the angle of tilt of the planer and the means for regulating the draw bar hitch have previously been described. The actuating mechanism; namely, ratchet 14 and pawl 15, serves at the same time as a differential mechanism so that there will be no binding action upon the gears when turning corners.

It will be observed that the chains or flexible devices 21 are attached to the upper face of the spider 19 and pass over the edge of the spider, being secured at their lower ends to the planer which is of larger diameter than the spider. Thus the chains are inclined to the vertical so that they are conically rather than cylindrically disposed. This conical disposition of the chains serves to stabilize the planer 20 and prevent it from swinging or swaying unduly.

When the machine is being drawn over the ground, the planer 20, by reason of frictional engagement with the ground, drags behind the spider 19. If the planer had no appreciable weight it would tip up at the rear and stand on its forward edge, but instead, due to its weight, the plane tends to maintain a position closely parallel to the ground with the rear portion of the planer slightly lifted and the forward edge digging into the ground. In this position the forward chains remain slack while those at the rear become taut, forcing the planer forward. By tilting the spider 19 on an axis transverse to the direction of travel to the machine the position of the planer with respect to the ground and the pressure of the planer on the ground and also the action of the planer on the ground may be varied. If the forward side of the spider is raised, the forward chains may be tautened until, at the extreme, position the forward side of the planer is raised clear of the ground and the rear side of the planer is dragged upon the ground surface. In other words, by varying the angle of the spider 19, about a transverse axis the planer may be drawn forward either by the forward chains or by the rear chains. In the former case the planer would dig into the ground, while in the latter case it would be dragged along the ground surface and it will be obvious that any effect between these two extremes may be obtained by proper angular adjustment of the spider 19. It will also be evident that as more or less of the weight of the planer is carried by the chains, depending upon the angular position of the planer with respect to the ground, the pressure of the planer on the ground is varied, but not positively, as would be the case if rigid connections were substituted for the flexible chains. This non-positive variation of pressure is particularly marked when the machine is in operation. As stated above, the chain are fastened to the upper surface of the spider 19 and pass over the edge of the spider, and as a consequence when in operation the planer drags behind the spider, the chains at the forward side will be bent over the edge of the spider and consequently the planer will swing on a shorter radius at the forward side of the machine than at the after side. This in itself tends to overcome to a certain extent, the tendency of the forward side of the planer to dig into the ground when the spider is set parallel to the ground. Furthermore, it will be observed that the edge of spider 19 is formed with recesses 19', through which the chains pass, and the side walls of these recesses engage the chains as the spider is revolved, thereby limiting the rotational lag of the planer behind that of the spider.

For transporting the planer over roads where it is not used for grading purposes, it will of course be desirable to elevate the drag above the ground. This may be accomplished, as shown in Fig. 3, by mounting the hub of the spider 19 and the hub of the gear 24 for relative sliding movement, and providing a hand wheel 35 having a screw threaded connection, as at 36, with the hanger 18. Turning of the hand wheel will effect elevation of the hub of the spider and consequent elevation of the drag above the ground.

Referring now to Fig. 5, I have illustrated a modified type of planer or drag member, which may be used with the mechanism shown in Figs. 1, 2, and 3. In this instance, the planer consists of a spider 70, provided with a hub 71 adapted to rotate on the hanger 18. The drag member 72 is substantially the same as that shown in Fig. 1, but instead of using the flexible device 21 to operatively connect spider and drag, I have shown bolts 73 connecting the rims of the spider and the drag member. With this form of device, the bolts may rigidly couple the spider and drag, so that the weight of the whole machine may be supported on the surface to be leveled.

Referring now to Fig. 6 of the drawings, it will be seen that I have illustrated a modified form of device suitable for cultivating purposes. With this form of apparatus, traction wheels 40 are fixed upon the axle 41 and a tongue 42, similar to the tongue 27, is connected to a hub 43 turnable on the central portion of the axle, and carrying depending bracket 44. The draw bar may consist, as in the previous type of machine, of a pair of angular members 45 secured at their rear ends to sleeves 46 on the axle 41. Bracket 44 includes a pair of laterally extending arms 47 terminating in bearing sleeves 48 for stub shafts 49. Beveled gears 50 on the stub shafts 49 are driven by beveled gears 51 on the axle 41 so that rotary motion is imparted to the stub shafts. Vertical levers 52 are pivoted on sleeves 53 freely secured upon the axle 41. The upper ends of the levers 52 are connected by an adjustable tie bar 54, the tie bar preferably comprising a pair of overlapping sections having openings 55 in their overlapping ends, through which a securing device 56 may be selectively passed to shorten or lengthen the tie bar. Links 57 pivotally connected to the lower ends of the levers 52 extend inwardly from the levers and carry at their free ends bearing sleeves 58 in which shafts 59 are journalled. Shafts 59 are coupled to the shafts 49 by universal joints 60, and at their lower ends, the shafts 59 carry agricultural implements 61, such as the harrows or planers shown. The teeth of these harrows may be constituted of short pipe sections as with the planer described above.

One manner of using the apparatus is shown in Fig. 6. In this case, the two harrows or other implements are tilted so that a ridge is formed between them, as the machine is moved over the ground. Preferably, the two harrows straddle a row of plants to be cultivated, and dragging them over the ground in the inclined position shown, will effect weeding of the rows and piling of the earth about the roots of the plants.

In Fig. 7, I have shown the apparatus of Fig. 6 converted into a mechanism for chopping a row of plants to reduce the number of plants in the row. The apparatus of Fig. 7 is substantially the same as that shown in Fig. 6, except for the fact that the shafts 59 are supported in a vertical position and that novel tools 80 are fixedly secured to the lower ends of the shafts 59 for revoluble movement. These tools consist of cutting discs having at spaced intervals recesses 81 in their cutting edges. The discs are revolved in opposite directions as indicated by the arrows of Fig. 8 and serve to chop or cut all of the plants in a row except those plants which come within mating recesses 81 of the discs, as the discs are revolved and move forwardly.

As shown in Fig. 8, the overlapping cutting edges of the discs serve to chop all of the plants in their path, while the mating recesses provide clearance at regular intervals for certain of the plants so that a row may be conveniently thinned out.

Figs. 9 and 10 indicate a modification of the cutting discs of Fig. 8. In these figures, I have shown tools which consist of spiders 90, carrying depending hollow arms 91, through which bolts 92 pass, securing cutting discs 93 in place on the ends of the arms. As seen in Fig. 10, two of these substantially star-shaped cutters are mounted in cooperative relationship and rotated, the discs 93 alternately chopping and missing plants in a row.

While I have illustrated an apparatus which is convertible for accomplishing a number of purposes and having a common operating mechanism under several conditions of use, it is to be understood that my invention contemplates the use of the novel types of tools disclosed in Figs. 6, 7 and 10, independently of the mechanism by which they are driven. The invention also contemplates the structural features of the driving and operating mechanism, which I have shown.

Numerous slight changes and alterations might be made in the general form and arrangement of the parts described without departing from the invention, and hence I do not wish to limit myself to the precise details set forth, but shall consider myself at liberty to make such changes and alterations as fairly fall within the spirit and scope of the appended claims.

I claim:

1. A road leveler or planer including a frame, traction wheels supporting the frame, a driving member carried by the frame and adapted to be rotated about a vertical axis by the traction wheels, and a ground engaging driven member flexibly suspended from the driving member.

2. A road leveler including a frame, traction wheels supporting the frame, a driving member carried by the frame and rotatable about a vertical axis, means actuated by rotation of the traction wheels for positively rotating said driving member, a ground engaging tool, and a flexible driving means connecting said driving member and said tool for effecting a non-positive rotation of said element.

3. In a machine of the character described, a ground smoothing tool, a rotatable driving member, and a conically disposed series of flexible elements connecting the tool to said driving member.

4. In a machine of the character described, a ground smoothing tool, a rotatable driving member, attaching means projecting from the upper face of the driving member and inset from the periphery thereof, and flexible supporting and driving elements passing over the periphery of said driving member and secured at one end to the attaching means and at the other to the tool.

5. In a machine of the character described, an annular ground smoothing element, a disk-shaped rotatable driving member, attaching devices projecting from the upper face of said driving member and inset from the outer periphery thereof, and a conical series of flexible supporting and driving elements connecting said ground smoothing element to said attaching devices.

6. In a machine of the character described, an annular ground smoothing element, a disk-shaped rotatable driving member formed with peripheral recesses, attaching lugs projecting from the upper face of the driving member and inset from the margin of said recesses, and flexible supporting and driving elements passing through said recesses and secured at one end respectively to said lugs and at the other end to said ground smoothing element.

7. A road leveler including a frame, traction wheels supporting the frame, a driving member carried by the frame and rotatable about a normally vertical axis, means actuated by the traction wheels for rotating said driving member, a ground engaging smoothing element, flexible connections between said driving member and said element for effecting rotation of said element, and means for tilting said driving member about a transverse horizontal axis.

EDGAR A. BURROW.